US00RE34905E

United States Patent [19]

Ausnit

[11] E Patent Number: Re. 34,905

[45] Reissued Date of Patent: Apr. 18, 1995

[54] METHOD AND APPARATUS FOR MAKING RECLOSABLE BAGS IN A FORM, FILL AND SEAL MACHINE

[75] Inventor: Steven Ausnit, New York, N.Y.

[73] Assignee: Minigrip, Inc., Orangeburg, N.Y.

[21] Appl. No.: 154,846

[22] Filed: Nov. 18, 1993

Related U.S. Patent Documents

Reissue of:

[64] Patent No.: 4,709,533
Issued: Dec. 1, 1987
Appl. No.: 944,980
Filed: Dec. 22, 1986

[51] Int. Cl.[6] ..... B65B 9/20; B65B 61/18

[52] U.S. Cl. ..... 53/412; 53/451; 53/552; 53/133.4; 53/374.3

[58] Field of Search ..... 53/412, 451, 137, 551, 53/373.5, 374.2, 550, 416, 133.4, 138.3, 552, 562, 568; 493/213, 214, 302; 156/66

[56] References Cited

U.S. PATENT DOCUMENTS

| | | | |
|---|---|---|---|
| Re. 29,043 | 11/1976 | Naito . | |
| 2,978,769 | 4/1961 | Harrah . | |
| 3,172,443 | 3/1965 | Ausnit . | |
| 3,593,483 | 7/1971 | Tracy | 53/551 X |
| 3,685,562 | 8/1972 | Ausnit . | |
| 3,780,781 | 12/1973 | Uramoto . | |
| 3,807,118 | 4/1974 | Pike . | |
| 3,815,317 | 6/1974 | Toss . | |
| 3,948,705 | 4/1976 | Ausnit . | |
| 4,046,408 | 9/1977 | Ausnit . | |
| 4,354,541 | 10/1982 | Tilman . | |
| 4,355,494 | 10/1982 | Tilman | 53/551 X |
| 4,372,793 | 2/1983 | Herz . | |
| 4,512,138 | 4/1985 | Greenawalt | 53/373 X |
| 4,532,754 | 8/1985 | Hokanson | 53/551 X |
| 4,601,694 | 7/1986 | Ausnit | 493/214 X |
| 4,617,683 | 10/1986 | Christoff | 53/416 X |
| 4,745,731 | 5/1988 | Talbott et al. | 53/551 X |
| 4,790,126 | 12/1988 | Boeckmann | 53/451 |
| 4,812,074 | 3/1989 | Ausnit et al. | 493/214 X |
| 4,894,975 | 1/1990 | Ausnit | 53/551 X |
| 5,127,208 | 7/1992 | Custer et al. | 53/551 X |
| 5,322,579 | 6/1994 | Van Erden | 53/551 X |

FOREIGN PATENT DOCUMENTS

| | | | |
|---|---|---|---|
| 2653753 | 6/1978 | Germany | 53/551 |

*Primary Examiner*—Horace M. Culver
*Attorney, Agent, or Firm*—Kane, Dalsimer, Sullivan, Kurucz, Levy, Eisele and Richard

[57] ABSTRACT

A method and apparatus for forming a vertical tubular form fill package feeding the film vertically downwardly over a spout, pressing the outer lateral edges of the film together between pressure rollers, feeding joined strips of plastic zipper consisting of interlocking elements and attaching webs between the outer edges of the film and the spout, positioning guide bars on either side of the zipper between the zipper webs and sealing bars outwardly of the guide bars with the sealing bars simultaneously forming a fin seal at the outer edge and joining the zipper webs to the inner surfaces of the film between the fin seal and the spout and thereafter cross-cutting and sealing to form packages enclosing contents dropped through the spout.

19 Claims, 1 Drawing Sheet

METHOD AND APPARATUS FOR MAKING RECLOSABLE BAGS IN A FORM, FILL AND SEAL MACHINE

Matter enclosed in heavy brackets [ ] appears in the original patent but forms no part of this reissue specification; matter printed in italics indicates the additions made by reissue.

BACKGROUND OF THE INVENTION

The invention relates to improvements in methods and apparatus for making reclosable bags and particularly in a form fill process wherein completed reopenable bags are formed by feeding film downwardly over a filling spout. More particularly, the invention relates to an improved manner in which completed packets or bags are formed with a reclosable zipper at the top edge and a safety seal joining the edges in an air-proof and moisture-proof seal outwardly of the reclosable zipper.

The art of making reclosable bags equipped with extruded plastic profile reclosable separable fastener means has experienced a long period of development as reflected in numerous patent disclosures. It has been conventional practice to extrude plastic material in tubular or sheet form with the profile separable fastener means co-extruded along and parallel to the longitudinal formation axis of the web, that is, the direction in which the web is extruded. On the other hand, prefabricated separable fastener strip means have been secured to separately formed web and with the fastener strip means extending longitudinally parallel to the longitudinal formation axis of the web. By way of example, U.S. Pat. Re. 29,043 is referred to as disclosing coextrusion of web and fastener means and forming the same into bag sections.

U.S. Pat. No. 3,948,705 exemplifies the technique of securing reclosable separable fastener strips to the plastic film parallel to the longitudinal formation axis of the web by fusion or heat seal methods.

Attachment of separable fastener strips parallel to the longitudinal formation of the axis of the web by adhesive means is exemplified in U.S. Pat. Nos. 4,372,793, 4,354,541 and 4,355,494.

U.S. Pat. No. 4,046,408 discloses separably interlockable fasteners along the edges of the plastic sheet material having generally arrow-shaped profiles, the fasteners being either integrally extruded from flat sheets or tubes of plastic film or supplied in the form of extruded strips attached to the web or film by heat sealing.

In the formation of reclosable plastic bags when the bags are used for foodstuffs and like material, it is advantageous to have the bags supplied with a tamper-proof seal which not only protects the contents from the ingress of foreign materials and contamination, but also prevents inadvertent or intentional opening prior to the bag and its contents being in the possession of the buyer. Such a protective seal if formed continuous externally of the reclosable seal can also protect the reclosable zipper elements from dust and dirt and other contaminants, with a permanent protective seal located outwardly of the reclosable seal, moisture and other foreign elements cannot enter the bag and the purchaser can see that he is obtaining a previously unopened and unused bag where the contents are fully protected. This conveys a feeling of safety and comfort to the purchaser who may be concerned about someone criminally obtaining access to the bag and placing dangerous contaminants into the contents.

Example of tamper-proof structures are shown in U.S. Pat. Nos. 2,978,769, 3,172,443, 3,685,562 and 3,780,781.

SUMMARY OF THE PRESENT INVENTION

By the present invention, the problems, disadvantages and shortcomings inherent in prior techniques are overcome especially as related to vertical form, fill and seal arrangements for making and filling bags but also for bag making generally.

An object of the present invention is to provide an improved method and apparatus for making and filling bags by a form fill technique wherein a reclosable zipper is fastened between the top lips of the bag and a complete seal joining the edges of the lips is formed outwardly of the reclosable seal, all simultaneously with the making and filling of the bags.

A further object of the invention is to provide an improved arrangement wherein bags are made by the form fill process and reclosable fastener strips are placed within the bag during the forming process with the reclosable elements placed immediately adjacent the form fill spout so that the bag can be completely filled with contents which are substantially against the reclosable zipper.

A further object is to provide an improved arrangement for making a bag in accordance with the foregoing objective wherein a security seal is placed just outside of the reclosable zipper, joining the outer edges of the film so that this outer seal must first be broken or cut off to open the bag and then a reopenable bag remains for conventional use.

In accordance with the principles of the present invention, an apparatus and a method is provided wherein film is fed downwardly wrapped around a form fill tube and the edges of the film are brought together pressed between pressing rollers guiding the edges together so that an outer seal can be formed. Means are provided for feeding interlocked zipper members between the film layers and between the rollers and the filling spout. Following the rollers there are located uniquely positioned and shaped bars which include inner bars that have a space between them to guide the center portion of the zipper and these bars also form a backing for outer heated bars which seal the webs of the zipper to the inner surface of the bag film. The outer bars also extend around the edges of the bag to simultaneously form an outer security seal or lip seal. The thus formed and sealed tube is filled through the spout and cross-seals with cross-cutters complete the individual bags.

DESCRIPTION OF THE DRAWINGS

Other objects, features and advantages of the present invention will become more apparent in connection with the teachings of the principles thereof in the specification, claims and drawings, in which:

DESCRIPTION OF THE PREFERRED EMBODIMENT

Figure 1:
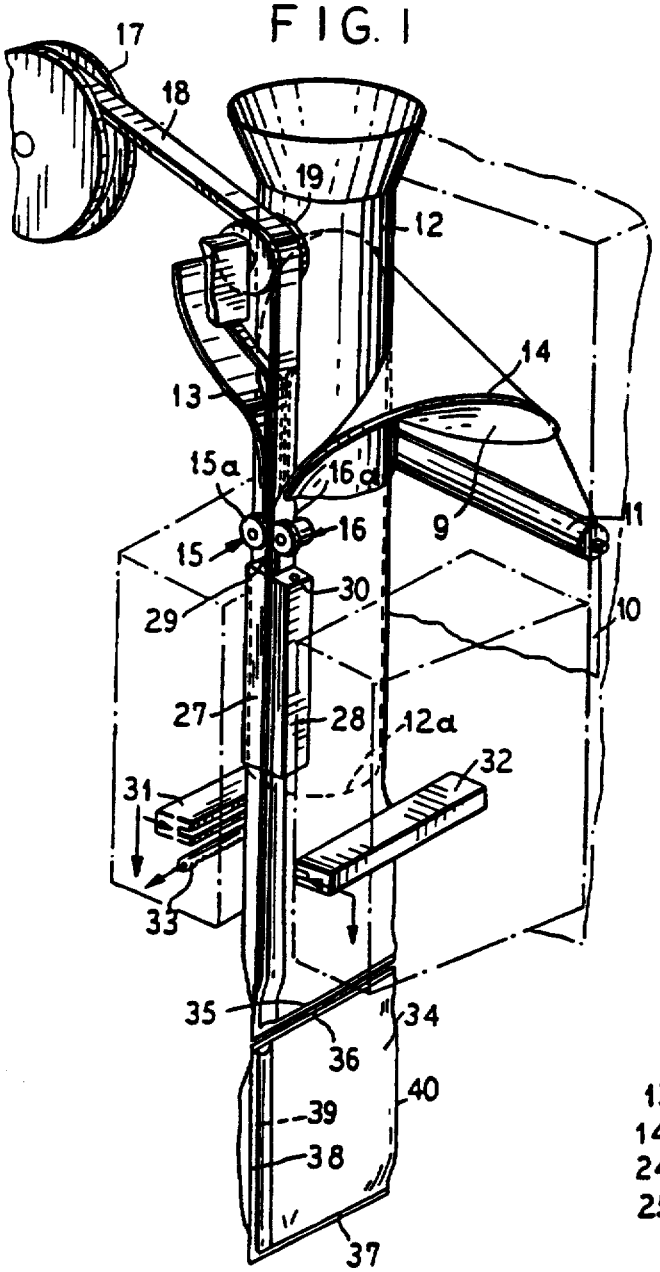
FIG. 1 is a perspective view of a form fill operation in accordance with the principles of the present invention.

As illustrated in FIG. 1, a sheet of thin plastic film 10 provided from a suitable continuous supply threaded er a roller 11 to be guided in a turn over a forming llar to pass downwardly over a filling spout 12. Lat- al guides may be provided to stabilize and help guide e film into tubular form over the cylindrical spout 12. ie spout has an upper end through which contents are posited to drop downwardly into the tube to be con- ned in bags being formed. The contents will then op downwardly through the lower end of the spout to individual bags which are cross-sealed and cut from e end of the thusly formed tube.

In the formation of the tube, lateral edges 13 and 14 of e film are brought together to form a fin seal which ill become the gab top. For guiding the edges and essing them together for the fin seal, rollers 15 and 16 aw and guide the material downwardly and the rol- rs are provided with suitable means for driving them rotation. The rollers have enlarged pressure portions 5a and 16a to press the edges 13 and 14 of the film gether for initiation of the film fin seal.

At the same time, joined fastener zipper members 18 re fed downwardly between the edges of the film as ie edges are brought together thereby sandwiching the ipper 18 therebetween. The zipper is supplied from a oll 17 over a guide roller 19 to position if directly ertically over the edges which are being brought to- ether.

Figure 3:
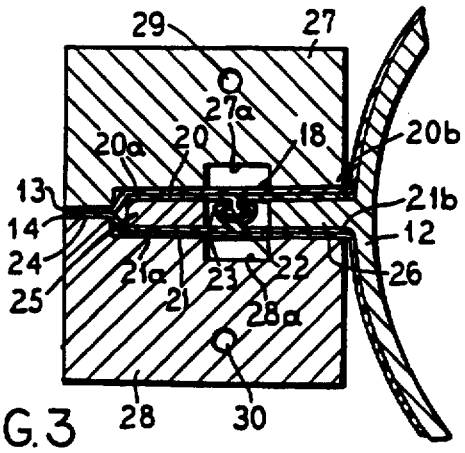
FIG. 3 is a horizontal sectional view taken substantially along line III—III of FIG. 2.

A preferred form of the zipper is illustrated in detail n FIG. 3 where the zipper 18 has a male portion 20 and female portion 21. The male portion has a rib 22 which s releasably interlocked in a groove 23. The zipper eing formed of flexible plastic releasably closes the top f the bag which is eventually formed and is reopenable y drawing apart the lips in a manner which is known to hose versed in the art.

The male portion 20 of the zipper strip has upper and ower webs 20a and 20b. The female portion 21 has ipper and lower webs 21a and 21b. These webs are ttached, preferably by heat sealing, to the inner surface f the film 10 to provide a permanent attachment be- tween the zipper and the top of the bag.

By using said webs to seal the zipper to the film, a broad area of attachment is made available, thereby creating the possibility of a strong bond between zipper and film. In addition, because of the width of the sealing area available, more tolerance in the alignment between the zipper web and film is permissible. Both of these functions allow for greater ease of manufacture.

Figure 2:
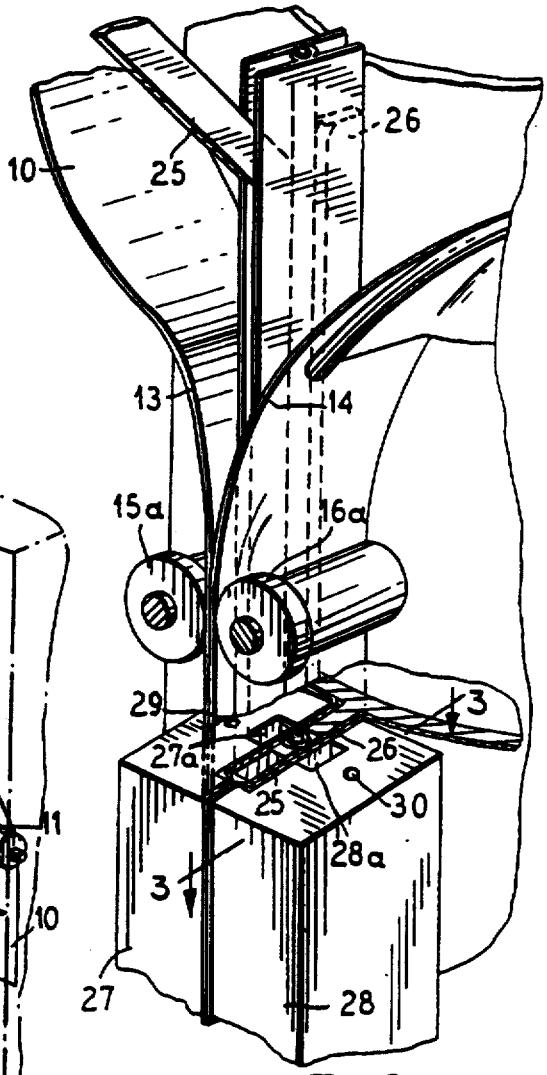
FIG. 2 is a somewhat enlarged perspective view with portions broken away to illustrate the joining and sealing of the edges of the bag and to illustrate the attachment of the reclosable zipper.

To accurately guide the zipper 18 and insure its continual parallel relationship to the edges 13 and 14 of the film, outer and inner bars 25 and 26 are located between the webs of the zipper members 20 and 21. The bars 25 and 26 are spaced sufficient to allow the joined rib and groove 22 and 23 to pass therebetween and the inner edges of the bars provide a channel which positively locates the rib and groove and insures that it will travel vertically a relatively exact distance from the edges 13 and 14 of the film. The bars 25 and 26 also separate the two film layers and the respective webs of each zipper portion from each other. The outer bar 25 is suitably mounted on a frame, not shown, as illustrated in FIG. 2, and the inner bar 26 is attached to and supported on the spout 12 as illustrated in FIG. 3.

For purposes of heat sealing the zipper to the film and for forming the fin seal at the outer edges of the film, a simultaneous sealing operation is conducted by opposed sealing blocks 27 and 28. These sealing blocks extend vertically positioned so that the film edge with the zipper sandwiched therebetween is drawn downwardly between the bars 27 and 28. Means for drawing down the film is provided, not shown.

The sealing bars 27 and 28 are suitably heated such as by heat elements 29 and 30 passing down therethrough.

The bars 27 and 28 are shaped with outer projections which form the fin seal at 24. Inwardly of the projection are recesses which are sufficiently deep to accommodate the positioning bars 25 and 26. The inner surfaces of the bars 27 and 28 apply heat to the film to form the fin seal at 24 and to join the webs of the zippers to the inner surface of the film. The film surfaces, except where they are joined to each other at 24 are kept separated by the positioning bars 25 and 26. This prevents the zipper webs and film layers from being sealed together. Rectangular groove 27a and 28a. FIGS. 2 and 3, provide a space opposite the rib and groove elements so that heat is not transmitted to the rib and groove elements to avoid softening the plastic to where the plastic might inadvertently permanently join the rib to the groove.

Essentially there is a dual function formed by the guide bars 25 and 26 in that they position the zipper strips and also provide a shoulder over which the film is drawn by the press rollers 15 and 16. As the edges of the film are brought together by the press rollers 15 and 16, the film is pulled slightly taut over the outer edge of the outer bar 25 thereby drawing the film firmly around the cylindrical spout 12.

The edges of the outer blocks 27 and 28 extend fully up to the spout 12 so that the film is pulled firmly about the spout as it passes downwardly. The zipper 18 is thus located close to the filling spout. This closeness allows the tube to be completely filled with contents against the zipper as the lower end 12a of the spout is passed.

Before a charge of contents is dropped down through the spout 12 into the tube which has been closed as it passes the lower end of the blocks 27 and 28, a cross-seal and cut is formed to complete the bag.

The cross-seal and cut are formed by opposed sealing bars 31 and 32 which have a recess therein to provide laterally extending but vertically spaced seals. A knife 33 is located in the recess to provide a cut between the seals, and as each cross-seal is made and each cut is made, a bag is severed from the continuous tube. The completed bag is shown at 34 with a bottom 40 and with side edges 36 and 37 formed by the sealing bars 31 and 32. The top of the bag has the security fin seal 38 and immediately inwardly of the fin seal is the interlocked zipper 39.

In operation, the film material 10 is continually fed into tubular shape over the spout 12. As the material is drawn downwardly, it is pressed at its edges 13 and 14 between the pressure rollers 15 and 16 which pull the web over the outer edge of the outer guide bar 25. The guide bars 25 and 26 guide the zipper vertically in an accurate position adjacent the outer edges 13 and 14 of the web and adjacent the filling tube 12. Outer heating blocks 27 and 28 simultaneously seal the film to the webs of the zipper and form the fin seal at the outer edge above the zipper. The thus sealed edge of the tube forms the top of the bags which are seamed and cut from the length of the tube by the bars 31 and 32 and the knife 33.

Thus, it will be seen that there has been provided an improved arrangement which meets the objectives and advantages above set forth and which simply and rapidly provides for continual formation of bags which have a top security seal outwardly of closed zipper elements which are adjacent the bag contents.

I claim as my invention:

1. The method of forming a vertical tubular form fill reclosable package from a sheet of plastic film comprising the steps:

continuously feeding a supply of thin thermoplastic film from a supply means;

wrapping the film into tubular shape over a filling spout bringing the lateral edges of the film together in abutting face-to-face relationship to form a tube;

attaching the faces of said edges together at a seal location to form a fin seal;

feeding a continuous supply of plastic zipper strip having first and second interlocking members each with a web *extending* on either side [of] *away from* said interlocking member into a space between said spout and said seal location;

and attaching said [members along their] webs *along two respective web locations* to the inner surface of the film between said seal location and said spout to provide a reopenable closure between the fin seal and contents of the tube supplied through the filling spout, *with said interlocking members being disposed between said web locations.*

2. The method of forming a vertical tubular form fill package from a sheet of plastic film in accordance with the steps of claim 1 including:

simultaneously attaching the faces of said edges together and attaching said members to the inner surface of the film at the same axial location.

3. The method of forming a vertical tubular form fill package from a sheet of plastic film in accordance with the steps of claim 1 including:

forming a cross-seal laterally of the tube subsequent to the location where the faces of the edges and the location where the members are attached.

4. The method of forming a vertical tubular form fill package from a sheet of plastic film in accordance with the steps of claim 3 including:

laterally cutting the tube through the cross-seal location so that a succession of reclosable containers are formed from the tube sealed at their ends.

5. The method of forming a vertical tubular form fill package from a sheet of plastic film in accordance with the steps of claim 4 including:

depositing a quantity of contents through the filling spout after the formation of the cross-seal so that each of the containers are filled with contents.

6. The method of forming a vertical tubular form fill package from a sheet of plastic film in accordance with the steps of claim 1 including:

guiding said zipper strip members relative to the edges of the film so that they are a uniform distance from the film edges.

7. The method of forming a vertical tubular form fill package from a sheet of plastic film in accordance with the steps of claim 1 including:

applying a pressure to force the lateral edges of the film together in advance of the location where the film edges are attached.

8. The method of forming a vertical tubular form fill package from a sheet of plastic film in accordance with the steps of claim 1 including:

permitting the layers of film to separate freely between the seal location and the tube.

9. The method of forming a vertical tubular form fill package from a sheet of plastic film in accordance with the steps of claim 1:

wherein the attachment is formed by a heat seal for attaching said edges and for attaching said members to the film.

10. An apparatus for forming a vertical tubular form fill reclosable package from a sheet of plastic film comprising in combination:

means for continuously feeding a supply of thermoplastic film to form a tube;

a supply spout for vertically dropping contents into the tube;

means guiding and wrapping said supply of film about the tube as the film moves downwardly;

first guide means positioned relative to the spout for bringing the lateral edges of the film together in confronting relationship;

first attaching means joining the edges of the film to form a fin seal at a seal location;

zipper feed means feeding first and second continuous zipper interlocking members each having a web *extending* on either side [of] *away from* said interlocking member into a space between said spout and seal location;

and second attaching means joining the zipper webs to the inner surface of the film *at two web locations* between said fin seal and spout to provide a reclosable closure inside the fin seal, *said interlocking members being disposed between said two web locations.*

11. An apparatus for forming a vertical tubular form fill package from a sheet of plastic film in accordance with the structure of claim 10:

wherein said first guide means includes a pair of opposed pressure rollers forcing the edges of the film together in advance of said first attaching means.

12. An apparatus for forming a vertical tubular form fill package from a sheet of plastic film in accordance with the structure of claim 11:

wherein said rollers are positioned axially in advance of said first and second attaching means relative to the direction of movement of the film.

13. An apparatus for forming a vertical tubular form fill package from a sheet of plastic film in accordance with the structure of claim 10:

wherein said second attaching means is in the form of opposed bars with at least one of said bars having a slot for receiving and guiding an enlarged bead portion of the zipper members relative to the edges of the film.

14. An apparatus for forming a vertical tubular form fill package from a sheet of plastic film in accordance with the structure of claim 10:

wherein said zipper feed means includes a center interlocked portion and web portions extending laterally therefrom and includes a first bar positioned between said center portion and said seal and a second bar between said center portion and said spout with the second bar supported on the spout.

15. An apparatus for forming a vertical tubular form fill package from a sheet of plastic film in accordance with the structure of claim 10:

wherein said first and second attaching means are positioned at the same axial location relative to the axis of the tube.

16. An apparatus for forming a vertical tubular form fill package from a sheet of plastic film in accordance with the structure of claim 15:

wherein said bars are heated and form said fin seals and the attachment of the zipper member is to the film at the same axial location.

17. An apparatus for forming a vertical tubular form fill package from a sheet of plastic film in accordance with the structure of claim 10:

wherein said second attaching means includes outer opposing bars positioned outwardly of the film and inner guide bars positioned between webs of the zipper members with said bars being heated for attaching thermoplastic material of the zipper to thermoplastic of the film.

18. An apparatus for forming a vertical tubular form fill package from a sheet of plastic film in accordance with the structure of claim 10:

wherein said zipper feed means supplies zipper members in interlocked relationship.

19. An apparatus for forming a vertical tubular form fill package from a sheet of plastic film in accordance with the structure of claim 10:

including means for laterally cross-sealing and cutting the film located after said first and second attaching means and encapsulating contents within the film supplied by the tube.

* * * * *